United States Patent [19]
Liao

[11] Patent Number: 5,628,236
[45] Date of Patent: May 13, 1997

[54] CUTTING METAL-WORKING MACHINE FOR PROCESSING HOOKE'S JOINTS

[76] Inventor: Yi L. Liao, P.O. Box 82-144, Taipei, Taiwan

[21] Appl. No.: 531,296

[22] Filed: Sep. 20, 1995

[51] Int. Cl.$^6$ ..................................... B23B 3/00
[52] U.S. Cl. ................... 82/133; 82/129; 82/165; 82/162
[58] Field of Search ............... 82/122, 133, 142, 82/148, 150, 162, 165, 129; 279/83, 67, 112

[56] References Cited

U.S. PATENT DOCUMENTS

| | | | |
|---|---|---|---|
| 1,937,240 | 11/1933 | Odum | 82/142 |
| 2,415,465 | 2/1947 | Cross | 82/150 X |
| 2,442,868 | 6/1948 | Dare | 82/133 X |
| 2,526,182 | 10/1950 | Williams | 82/150 |
| 2,557,582 | 6/1951 | Turrettini | 82/165 X |
| 3,473,424 | 10/1969 | Mascherpa | 82/133 X |
| 3,481,231 | 12/1969 | Cormier | 82/133 |
| 4,625,461 | 12/1986 | Vetter | 82/148 X |
| 4,706,530 | 11/1987 | Thomas | 279/83 X |

FOREIGN PATENT DOCUMENTS

| | | | |
|---|---|---|---|
| 3429022 | 2/1986 | Germany | 82/122 |

*Primary Examiner*—M. Rachuba
*Assistant Examiner*—Henry W. H. Tsai
*Attorney, Agent, or Firm*—Alfred Lei

[57] ABSTRACT

A cutting metal-working machine for processing hooke's joints, including a machine base, a control panel for controlling the operation of the machine, a left tool carrier and a right tool carrier mounted on the machine base at two opposite locations and having a respective cutting tool controlled to synchronously cut two opposite ends of the workpiece, a first tailstock and a second tailstock respectively mounted on the machine base at two opposite ends and having a respective center pin moved by a hydraulic cylinder to hold the workpiece in place, and a workpiece rotating mechanism mounted between the tool carriers and the center pins of the tailstocks, and controlled to turn the workpiece relative to the cutting tools of the tool carriers.

1 Claim, 7 Drawing Sheets

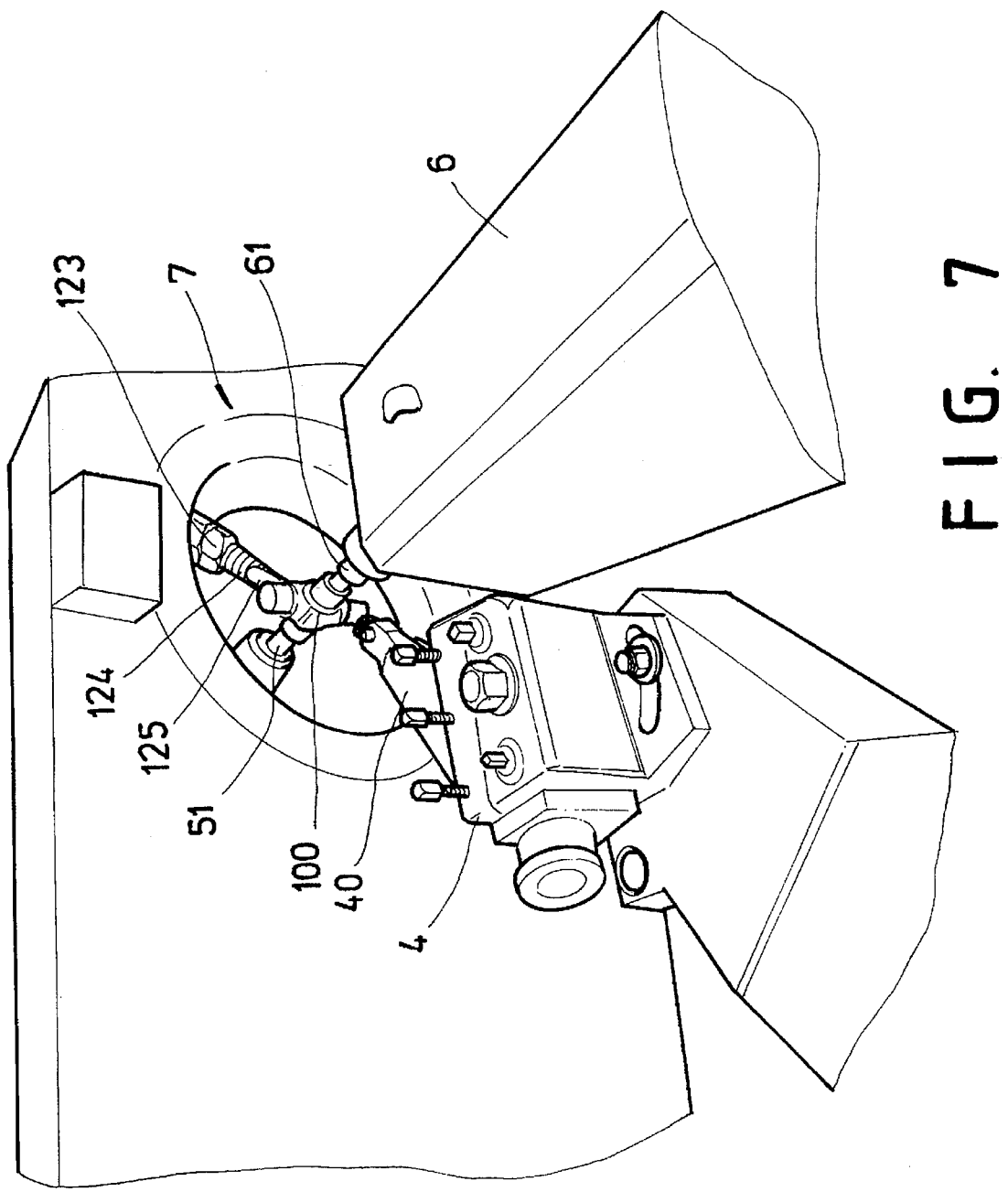

CUTTING METAL-WORKING MACHINE FOR PROCESSING HOOKE'S JOINTS

BACKGROUND OF THE INVENTION

1. Field of the Invention

This invention relates to cutting metal-working machines for processing hooke's joints, and relates more particularly to such a cutting metal-working machines which uses two tailstocks to hold the workpiece, a workpiece rotating mechanism to turn the workpiece, and two tool carriers to synchronously process two opposite ends of the workpiece.

2. Description of the Prior Art

Regular cutting metal-working machines for processing hooke's joints commonly comprise a chuck for holding one end of the workpiece, a tailstock having a center pin for holding an opposite end of the workpiece, and a tool carrier for holding a cutting tool for processing the workpiece. This structure of cutting metal-working machine can only process the four shafts of the workpiece one after another. Because the four shafts of the workpiece are processed one after another, it is difficult to control the precision of the finished product. Furthermore, this processing process wastes much labor and working time. Therefore, the manufacturing cost of the hooke's joints cannot be reduced to the desired level.

SUMMARY OF THE INVENTION

This invention relates to cutting metal-working machines for processing hooke's joints, and relates more particularly to such a cutting metal-working machines which uses two tailstocks to hold the workpiece, a workpiece rotating mechanism to turn the workpiece, and two tool carriers to synchronously process two opposite ends of the workpiece.

This invention is designed to provide a cutting metal-working machine for processing hooke's joints which eliminates the aforesaid drawbacks.

It is therefore one object of the present invention to provide a cutting metal-working machine for processing hooke's joints which is practical for synchronously processing two opposite ends of the workpiece. It is another object of the present invention to provide a cutting metal-working machine for processing hooke's joints which greatly improves the precision of the hooke's joints. It is still another object of the present invention to provide a cutting metal-working machine for processing hooke's joints which is easy to operate. It is still another object of the present invention to provide a cutting metal-working machine for processing hooke's joints which greatly reduces the manufacturing cost of the hooke's joints.

According to one aspect of the present invention, the cutting metal-working machine comprises a machine base, a control panel for controlling the operation of the machine, a left tool carrier and a right tool carrier mounted on the machine base at two opposite locations and having a respective cutting tool controlled to synchronously cut two opposite ends of the workpiece, a first tailstock and a second tailstock respectively mounted on the machine base at two opposite ends and having a respective center pin moved by a hydraulic cylinder to hold the workpiece in place, and a workpiece rotating mechanism mounted between the tool carriers and the center pins of the tailstocks, and controlled to turn the workpiece relative to the cutting tools of the tool carriers. According to another aspect of the present invention, the workpiece rotating mechanism comprises a motor having a motor shaft, a driving belt wheel fixedly mounted around the motor shaft, a race, a ball bearing mounted within the race, a driven belt wheel supported on the ball bearing, and two transmission belts coupled between the driving belt wheel and the driven belt wheel, the driven belt wheel comprises an annular chamber, which receives the ball bearing and the race, a center through hole, two nuts fixedly fastened to the periphery of the center through hole at two opposite sides, and two screw rods respectively threaded into the nuts to hold the workpiece between, each screw rod having a beveled surface for stopping against the workpiece.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 7 is an elevational view showing the workpiece suspended in the workpiece rotating mechanism, retained in place between the center pins of the tailstocks, and processed by the cutting tools of the tool carriers.

DETAILED DESCRIPTION OF THE PREFERRED EMBODIMENT

Figure 1:
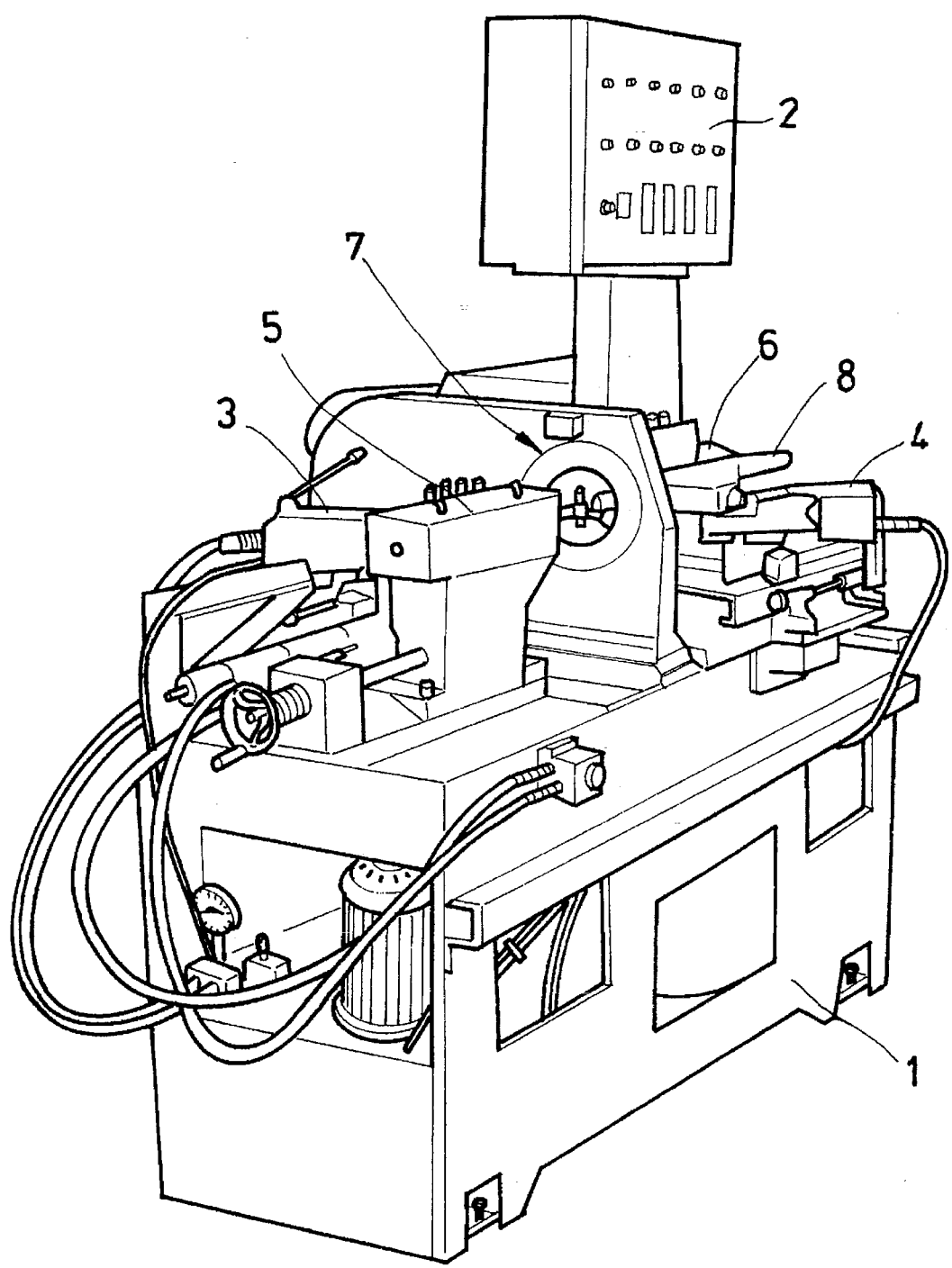
FIG. 1 is an elevational view of a cutting metal-working machine for processing hooke's joints according to the present invention.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Referring to FIG. 1, a cutting metal-working machine in accordance with the present invention is generally comprised of a machine base 1, a control panel 2, a left tool carrier 3, a right tool carrier 4, a left tailstock 5, a right tailstock 6, a workpiece rotating mechanism 7, and a hydraulic cylinder 8.

Figure 5:
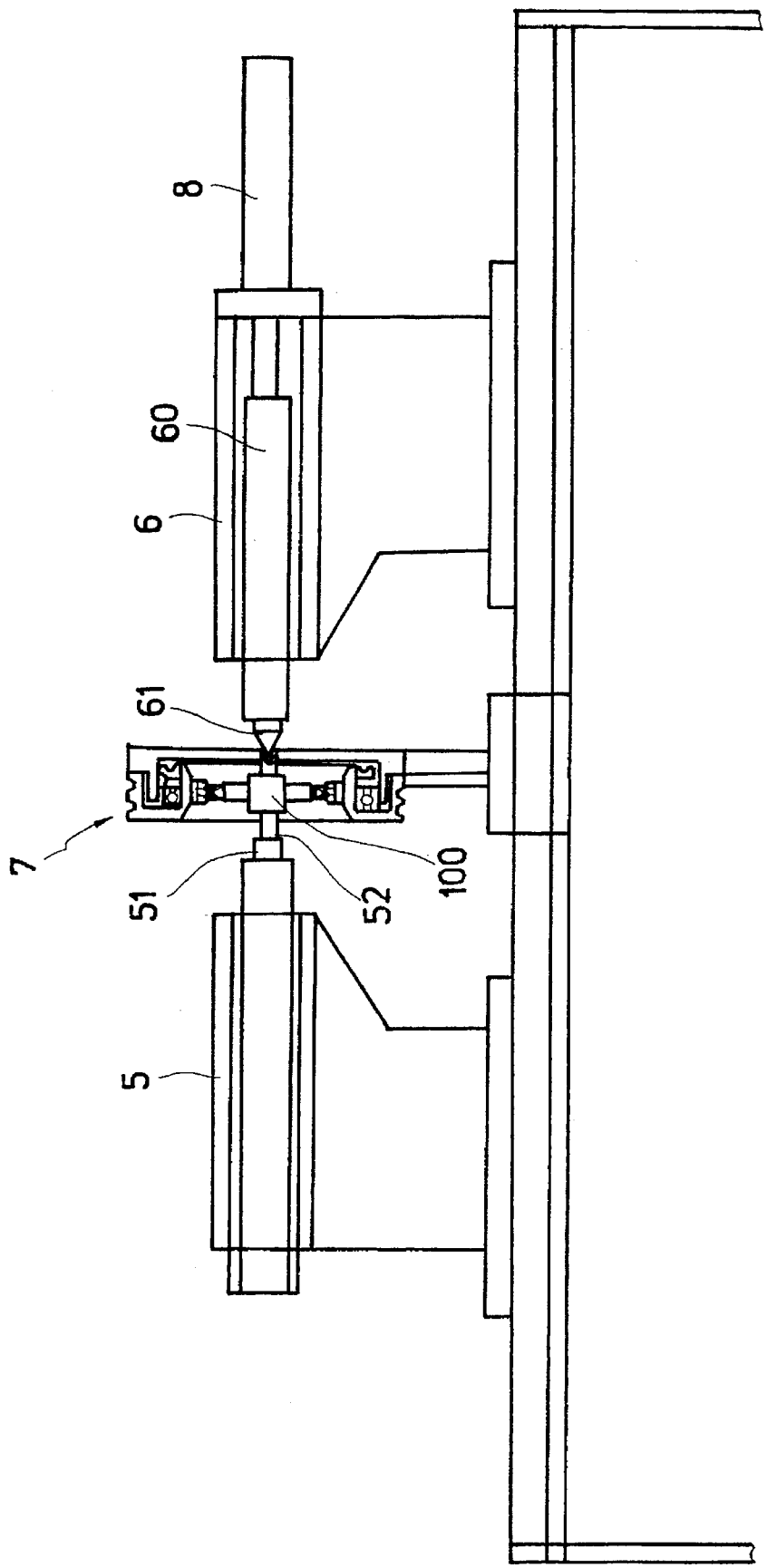
FIG. 5 is a front plain view showing the workpiece suspended in the workpiece rotating mechanism and processed by the cutting tools of the tool carriers according to the present invention.
Figure 6:
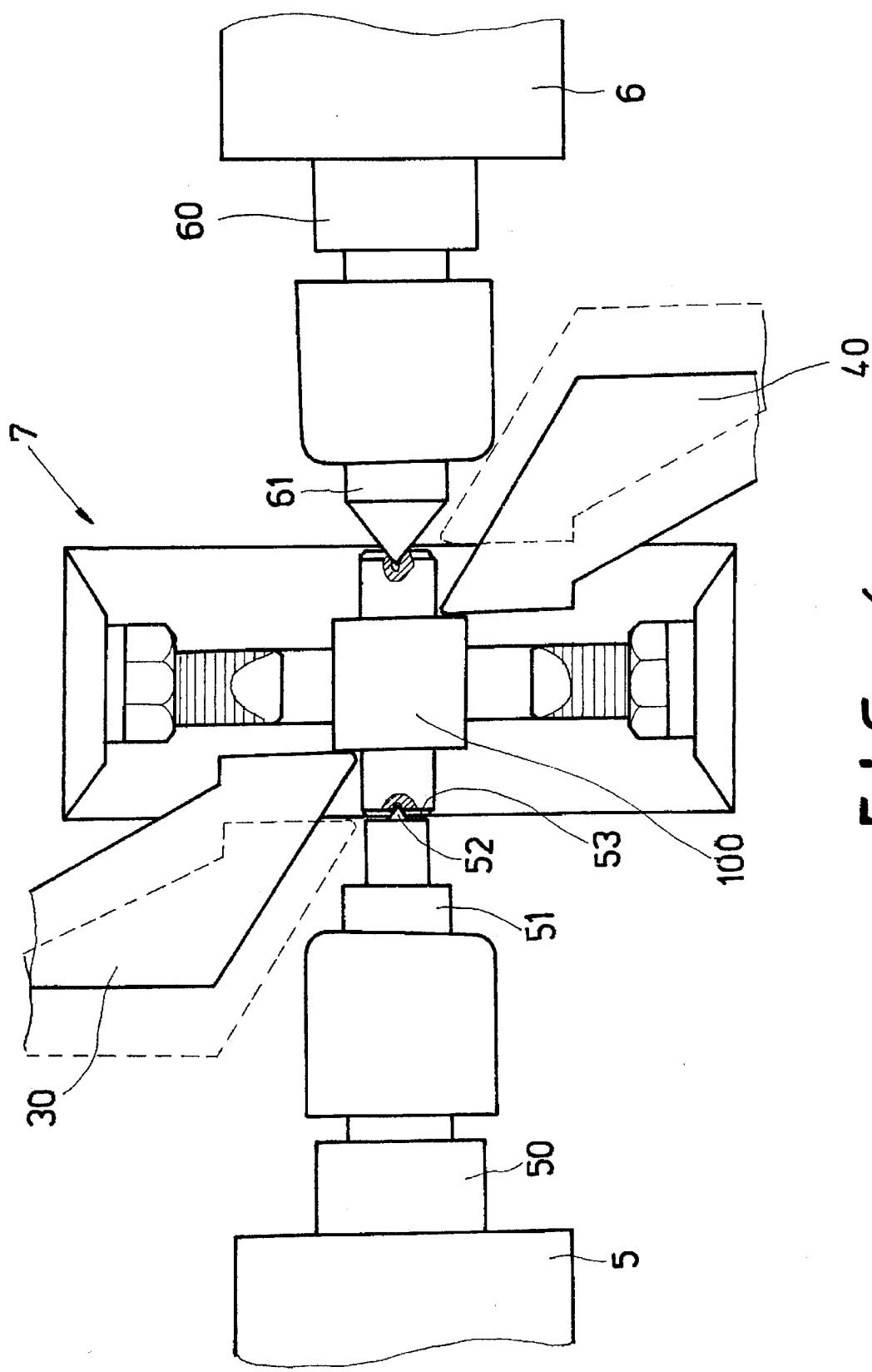
FIG. 6 is a top plain view showing the workpiece suspended in the workpiece rotating mechanism, retained in place between the center pins of the tailstocks, and processed by the cutting tools of the tool carriers.

Referring to FIGS. 5 and 6, and FIG. 1 again, the tool carriers 3 and 4 are diagonally mounted on the machine base 1 near two opposite ends, and synchronously driven to move relative to the workpiece. The left tailstock 5 comprises a shaft 50 and a center pin 51 fastened to the shaft 50 (see FIGS. 5 and 6). The center pin 51 of the left tailstock 5 has an end edge 53 stopped against the hooke's joint (workpiece) 100, and a conical tip 53 fitting the conical center hole of the hooke's joint (workpiece) 100. The right tailstock 6 comprises a shaft 60 coupled to the hydraulic cylinder 8, and a center pin 61 fastened to the shaft 60. When the hydraulic cylinder 8 is operated, the shaft 60 is driven to move the center pin 61. The workpiece rotating mechanism 7 is mounted between the tool carriers 3 and 4 and the center pins 51 and 61 of the tailstocks 5 and 6.

Figure 2:
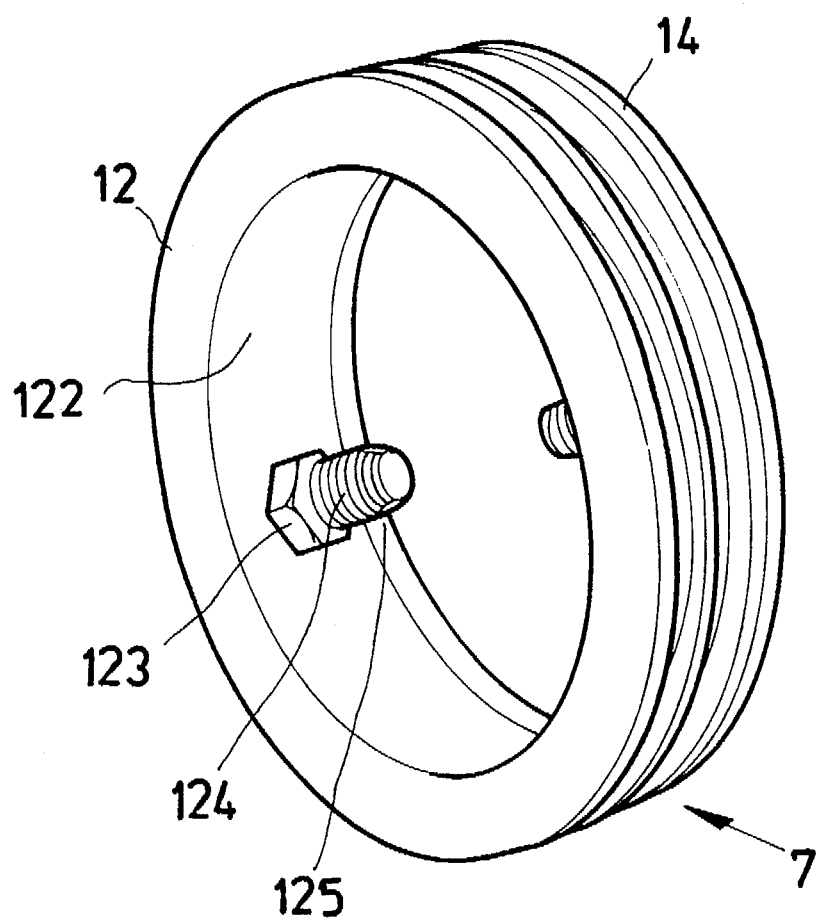
FIG. 2 is an elevational view of the driven belt wheel of the workpiece rotating mechanism according to the present invention.
Figure 3:
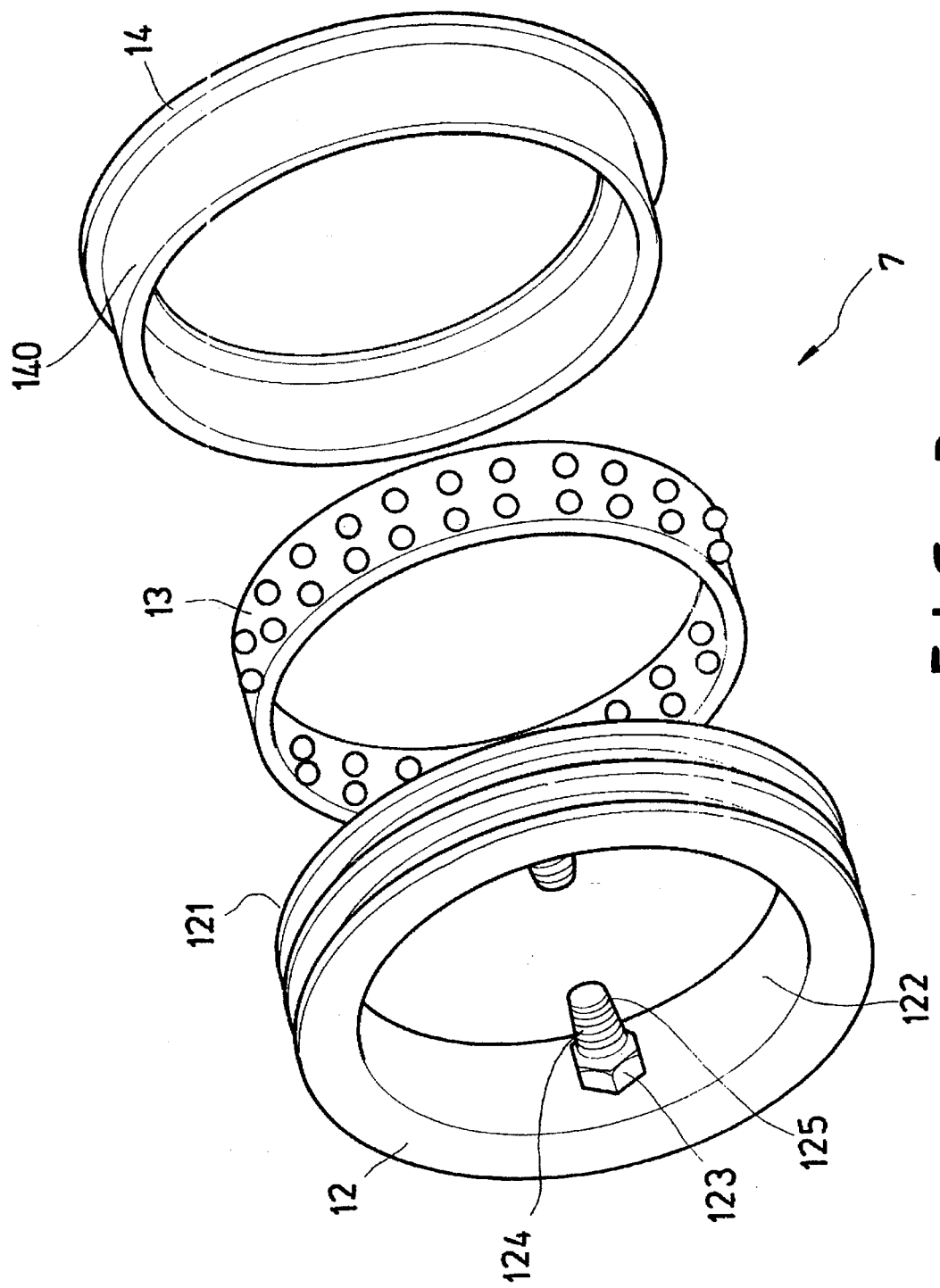
FIG. 3 is an exploded view of the driven belt wheel, ball bearing, and race of the workpiece rotating mechanism according to the present invention.
Figure 4:
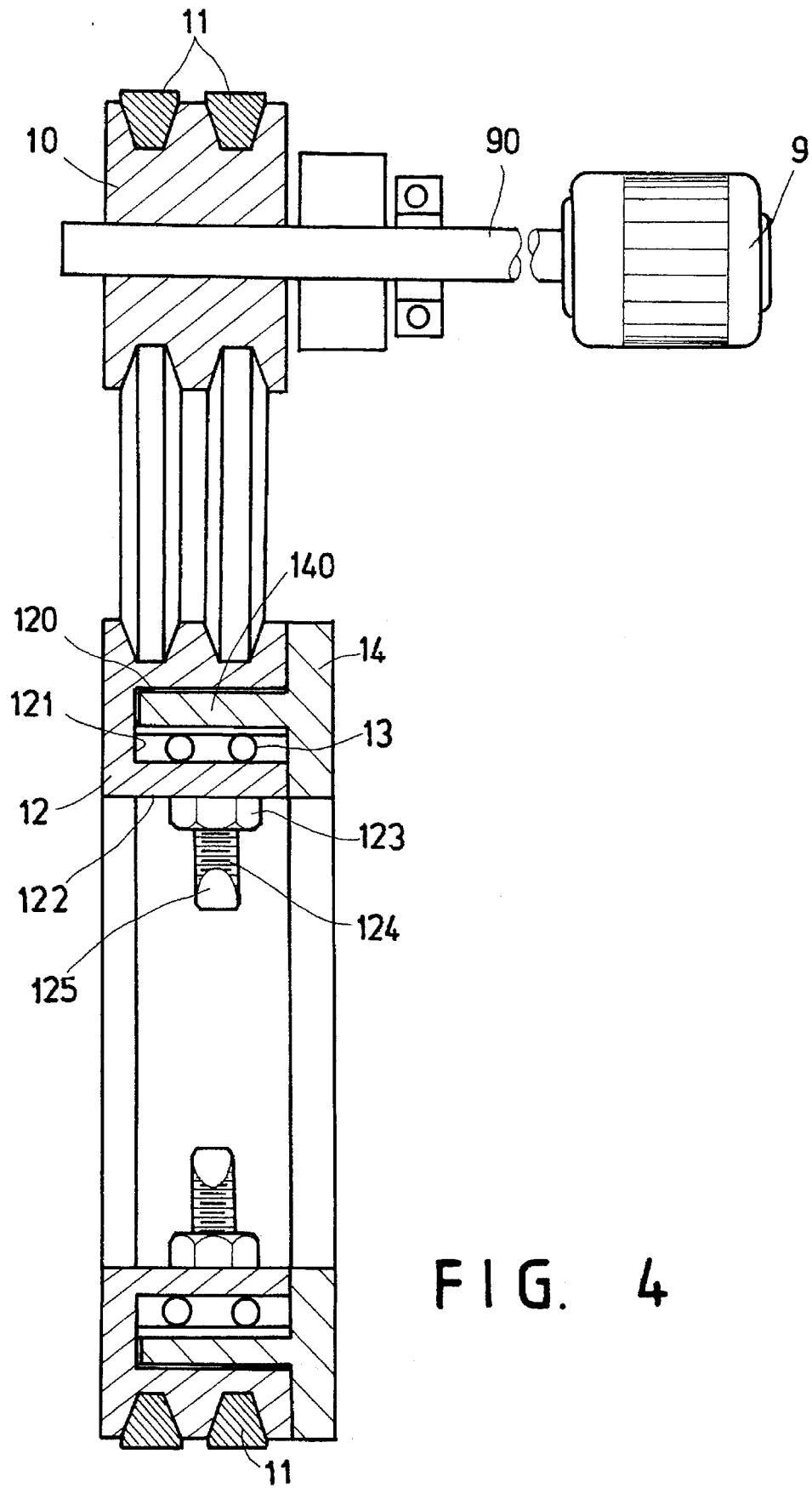
FIG. 4 is a plain view in section of the workpiece rotating mechanism according to the present invention.

Referring to FIGS. 2, 3, and 4, the workpiece rotating mechanism 7 comprises a motor 9 having a motor shaft 90, a driving belt wheel 10 fixedly mounted around the motor shaft 90, a race 14, a ball bearing 13 mounted within the race 14, a driven belt wheel 12 supported on the ball bearing 13, two transmission belts coupled between the driving belt wheel 10 and the driven belt wheel 12. The driven belt wheel 12 comprises an annular chamber 121, which receives the ball bearing 13. When the ball bearing 13 is inserted into the annular chamber 121, an annular space 120 is left within the annular chamber 121 around the ball bearing 13 for receiving the annular race body 140 of the race 14. The driven belt wheel 12 further comprises two nuts 123 fixedly fastened to the periphery of the inner diameter 122 thereof at two opposite locations, and two screw rods 124 respectively threaded into the nuts 123, wherein each screw rod 124 has a beveled surface 125 at the top. When installed, the beveled surfaces 125 of the screw rods 124 are stopped against the workpiece 100 at two opposite sides, and therefore the workpiece 100 is firmly retained in place (see FIG. 7).

Referring to FIGS. 5 and 6, and FIG. 4 again, when to cut the workpiece 100, the center pins 51 and 61 are stopped at two opposite ends (the left shaft and the right shaft) of the workpiece 100, then the driven belt wheel 12 is turned by the motor 9 through the driving belt wheel 10 via the transmission belts 11, causing the workpiece 100 rotated by the screw rods 124 of the driven belt wheel 10. When the workpiece 100 is rotated by the workpiece rotating mechanism 7, the tool carriers 3 and 4 are simultaneously driven to move a respective cutting tool 30 or 40 from the respective starting position (the dotted line) to the respective end position (the real line).

Referring to FIG. 7, the tool carriers 3 and 4 are synchronously operated to move the cutting tools 30 and 40 in processing the workpiece 100, the center pins 51 and 61 of the tailstocks 5 and 6 are respectively stopped against the workpiece 100 at two opposite sides to hold the workpiece 100 in place, and the beveled surfaces 125 of the screw rods 123 are stopped against the workpiece 100 at two opposite locations and carried by the driven belt wheel 12 to turn the workpiece 100.

As indicated, the workpiece 100 is suspended in the workpiece rotating mechanism 7 and turned by it for synchronous processing by the cutting tools 30 and 40 of the tool carriers 3 and 4.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A cutting metal-working machine for processing hooke's joints, comprising a machine base, a control panel for controlling the operation of the machine, a left tool carrier and a right tool carrier mounted on said machine base at two opposite locations and having a respective cutting tool controlled to synchronously cut two opposite ends of the workpiece, a first tailstock and a second tailstock respectively mounted on said machine base at two opposite ends and having a respective center pin moved by a hydraulic cylinder to hold the workpiece in place, and a workpiece rotating mechanism mounted between said tool carriers and the center pins of said tailstocks, and controlled to turn the workpiece relative to the cutting tools of said tool carriers, wherein said workpiece rotating mechanism comprises a motor having a motor shaft, a driving belt wheel fixedly mounted around said motor shaft, a race, a ball bearing mounted within said race, a driven belt wheel supported on said ball bearing, and two transmission belts coupled between said driving belt wheel and said driven belt wheel, said driven belt wheel comprises an annular chamber, which receives said ball bearing and said race, a center through hole, two nuts fixedly fastened to the periphery of said center through hole at two opposite sides, and two screw rods respectively threaded into said nuts to hold the workpiece between, each screw rod having a beveled surface for stopping against the workpiece.

* * * * *